INVENTOR.
RICHARD L. SNYDER,
BY Walter J. Adam
ATTORNEY.

Aug. 1, 1967 R. L. SNYDER 3,334,343

ANALOGUE MEMORY SYSTEM

Filed April 27, 1964

6 Sheets-Sheet 2

INVENTOR.
RICHARD L. SNYDER,
BY Walter J. Adam
ATTORNEY.

INVENTOR.
RICHARD L. SNYDER,
BY
Walter J. Adam
ATTORNEY.

INVENTOR.
RICHARD L. SNYDER,
BY
Walter J. Adam
ATTORNEY.

INVENTOR.
RICHARD L. SNYDER
BY
Walter J. Adam
ATTORNEY.

Aug. 1, 1967 R. L. SNYDER 3,334,343

ANALOGUE MEMORY SYSTEM

Filed April 27, 1964

6 Sheets-Sheet 6

INVENTOR.
RICHARD L. SNYDER,
BY
Walter J. Adam
ATTORNEY.

United States Patent Office 3,334,343

Patented Aug. 1, 1967

3,334,343

ANALOGUE MEMORY SYSTEM

Richard L. Snyder, Fullerton, Calif., assignor to Hughes Aircraft Company, Culver City, Calif., a corporation of Delaware Filed Apr. 27, 1964, Ser. No. 362,625
5 Claims. (Cl. 340—347)

This invention relates to memory systems and particularly to a simplified and reliable analogue memory system in which encoded digital values are converted to analogue values utilizing the principle of shifting magnetic domains.

Conventional electronic memory systems may be utilized to storge analogue data by encoding the analogue signals to digital form, retrieving the digital information and reconveying or decoding the digital information to an analogue form. The present invention describes a system in which the conventional encoding operation is required but the decoding is performed as an automatic function of the system. An additional attribute of the present invention is the capability of simultaneously providing many analogue output signals from the memory to enable a plurality of digital values or encoded analogue values to be compared.

It is therefore an object of this invention to provide an analogue memory system which stores digital information and reproduces the stored information in analogue form.

It is a further object of this invention to provide a memory system capable of simultaneously reproducing a plurality of analogue signals.

It is a still further object of this invention to provide an improved analogue to digital converter system utilizing the principle of shifting series of magnetic domains along a magnetic medium.

Briefly, the analogue memory system in accordance with the principles of this invention includes a magnetic digital storage system responsive to an analogue to digital encoder and in which the digital information is recorded in sequence along a magnetic medium as magnetic domains of selected polarities. The magnetic domains are responsive to polyphase magnetic fields for being propagated along the magnetic medium. The analogue signals are reproduced by a set of sensing or pickup conductors each having a selected number of turns, in one arrangement of the invention, proportional to the value of the digits being sensed from the propagated domains. The sum of the signals developed by the sensing conductors represent the analogue value of the stored digital numbers. A plurality of sets of sensing conductors may be utilized in accordance with the invention to provide simultaneous reproduction of a plurality of different numbers stored in the system.

The novel features of this invention as well as the invention itself, will best be understood from the accompanying description, taken in connection with the accompanying drawings in which like reference characters refer to like parts, and in which.

Figure 1:
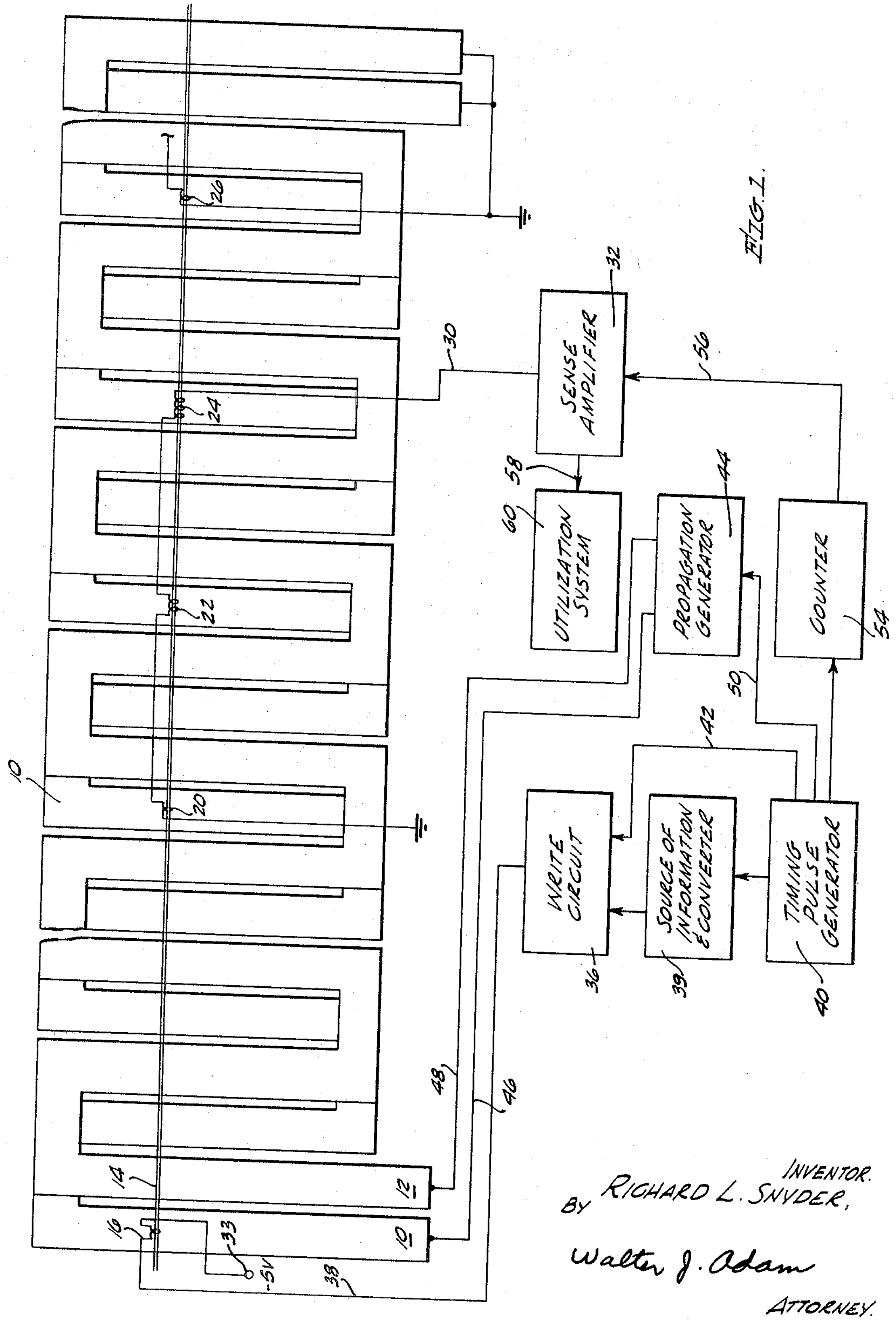
FIG. 1 is a schematic diagram of a digital to analogue converter system in accordance with the principles of the invention.

Referring first to FIG. 1, which shows an analogue memory system including a digital to analogue converter for combining weighted voltages in series, first and second propagating conductors 10 and 12 are provided with segments forming loops and offset relative to each other so that adjacent segments are formed from different ones of the two conductors. A suitable magnetic medium 14 which may be a magnetic wire or tape maintained under a suitable tension to provide orientation or a film such as thin film having a longitudinal orientation therealong is positioned adjacent to the conductors 10 and 12 substantially at right angles to the segments thereof. The conductors 10 and 12 are insulated from each other and from the wire 14. If the medium 14 is a magnetic wire, it may be maintained under a tension by suitable mounting structures not shown. Also in accordance with the principles of the invention, a complementary pair of magnetic mediums or wires may be utilized instead of the single wire 14 so that each magnetic domain in the first medium has an adjacent domain of the opposite polarity in the second medium. A write coil or conductor 16 is magnetically coupled or wound around the wire 14 at a first end thereof which may be adjacent to the propagating conductor 10. As will be explained in further detail subsequently, magnetic domains which may alternately be a reference domain and an informational domain are established by the coil 16 in the wire 14 and propagated subsequently therealong. For example, in one arrangement in accordance with the invention, an informational domain may be of a selected first or second polarity respectively representative of a binary "zero" or a "one" and a reference domain may consistently be of the first polarity. The propagation may be performed in cycles of four phases so that each magnetic domain moves a distance substantially equal to the width of one segment of the conductor 10 or 12 during each of the four phases.

For interrogating the binary information, the presence of domain walls which may be formed by like adjacent magnetic poles between a "one" domain and a reference domain are sensed by a set of read conductors or coils 20, 22 and 24 respectively having a turns or coupling ratio of 1, 2 and 4. Because a domain representing a binary bit and the adjacent reference domain have a length equal to four segments of the conductors, the read coils 20, 22 and 24 are positioned four segments apart along the wire 14 so that three binary bits may be simultaneously sensed thereby. For example, in a binary number having three bits the most significant bit is sensed by the coil 24 and the least significant bit is sensed by the coil 20. To combine the sensed voltages the coils 20, 22 and 24 are coupled in series between ground and a lead 30 which applies an analogue voltage through a strobed sense amplifier 32 each fourth cycle. The sense amplifier 32 may be any conventional sense amplifier with a strobing gate or "and" gate and having a desired gain, as is well known in the art. For simultaneously reading more than one stored number an additional set or sets of sense coils may be provided shown as a sense coil 26 for sensing the least significant bit.

A write circuit 36 applies binary signals through a lead 38 and through the write coil 16 to a —5 volt terminal 33, current flowing in a first direction for recording a binary "one" and in a second direction for establishing a reference domain or a "zero" domain. A source of information 39 applies sequential binary information to the write circuit 36 as controlled by a timing pulse generator or source of clock pulses 40. The source 39 may include a source of analogue signals and a conventional analogue to digital converter or encoder as well known in the art. Timing or clock pulses are also applied from the timing pulse generator 40 through a composite lead 42 to the write circuit 36. To provide the polyphase driving signals a propagation generator 44 is coupled through leads 46 and 48 to the respective conductors 10 and 12, the other ends thereof being coupled to a suitable source of reference potential such as ground. The propagation generator 44 may also respond to clock pulses applied from the timing pulse generator 40 through a composite lead 50. Strobing of the sense amplifier 32 may be provided by a timing or a clock signal applied from the pulse generator 40 to a counter circuit 54 and through a lead 56 to the sense amplifier 32. The analogue voltage signal passed through the sense amplifier 32 may be applied through a lead 58 to a utilization system 60 which may include an analogue computer, for example.

The magnetic wire such as 14 may be magnetically oriented or have an anisotropy along the longitudinal axis thereof, that is, the magnetic dipoles or elements have a preferred direction of alignment along the longitudinal axis. The magnetic orientation may be provided by maintaining the wires under a stress condition such as axial tension, torsion or axial compression. The stress may, in some arrangements, be substantially near the yield point of the material, but the invention is not to be limited to any particular stress condition. For some magnetic materials such as thin films, longitudinal orientation for operation of the system in accordance with the invention is provided without a stress condition so that the principles of the invention are applicable to any magnetic material being sufficiently oriented or having sufficient anisotropy to provide domain propagation. An oriented magnetic medium has the property that substantially more magnetimotive force must be applied thereto to establish or nucleate a magnetic domain in the direction of orientation than is required to propagate, in the direction of orientation, an established domain wall or the joining of two like magnetic poles. The wire 14 may be of a nickel-iron material, for example.

Figure 2:
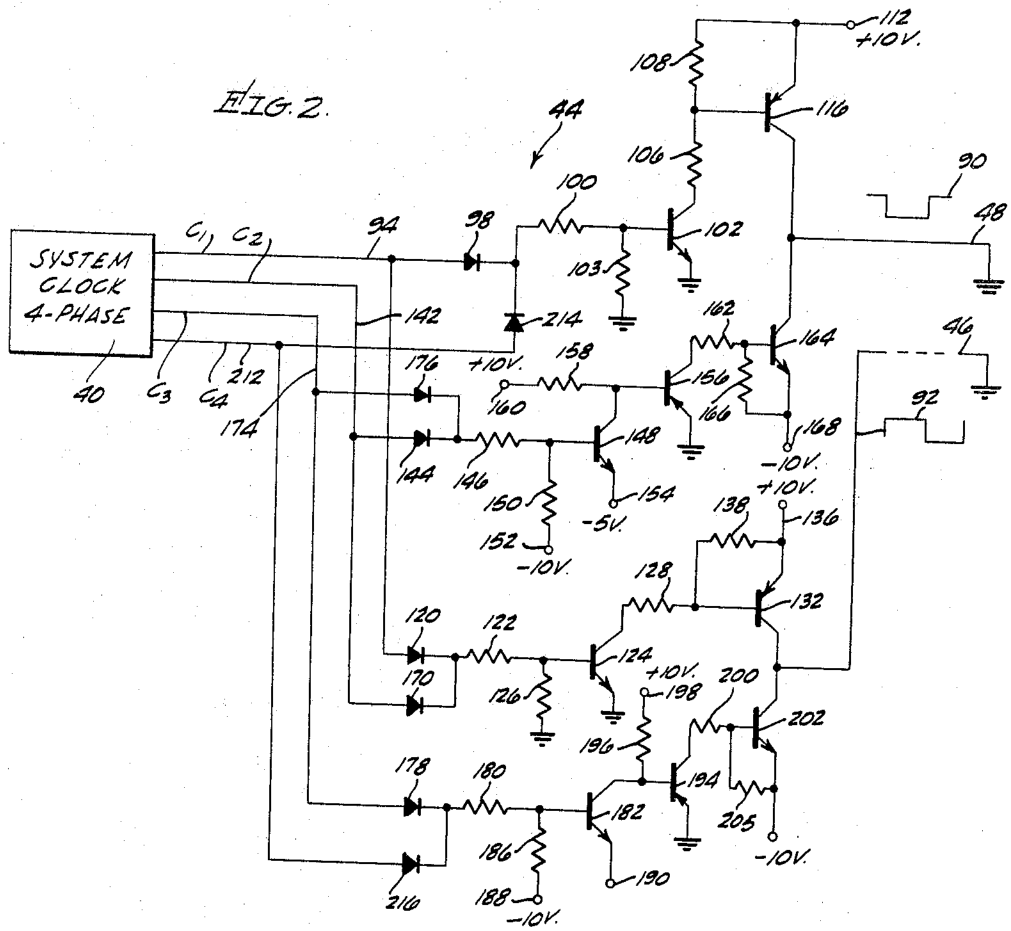
FIG. 2 is a schematic circuit and block diagram of a propagation generator that may be utilized in the system of FIG. 1 or in the other systems in accordance with the invention.

Referring now to FIG. 2, the propagation generator 44 responds to the clock or timing pulse generator 40 which has a four period timing sequence for controlling the driving arrangement of the invention. As may be seen in FIG. 4, the clock 40 provides clock signals $C_1$, $C_2$, $C_3$ and $C_4$ of waveforms 80, 82, 84 and 86 on the composite lead 50 (FIG. 1) having pulses at respective times $T_1$, $T_2$, $T_3$ and $T_4$. In response to these clock pulses the driving circuit 44 applies driving current signals of waveforms 90 and 92 to respective leads 48 and 46 which, as will be explained subsequently, provides the continuous driving fields along the wire 14 of FIG. 1. The first clock signal $C_1$ is applied through a lead 94, through the anode to cathode paths of a diode 98, and through a resistor 100 to the base of an npn type transistor 102. The base of the transistor 102 is also coupled to ground through a resistor 103, the emitter is coupled directly to ground, and the collector is coupled through series coupled resistors 106 and 108 to a +10-volt terminal 112. The signal is applied from between the resistors 106 and 108 to the base of a pnp type transistor 116 of which the emitter is coupled to the terminal 112 and the collector is coupled to the conductor 48. The clock signal $C_1$ is also applied from the lead 94 through the anode to cathode path of a diode 120 and through a resistor 122 to the base of an npn type transistor 124. The base of the transistor 124 is coupled to ground through a biasing resistor 126, the emitter is coupled to ground and the collector is coupled through a resistor 128 to the base of a pnp type transistor 132. A suitable source of potential such as a +10-volt terminal 136 is coupled to the emitter of the transistor 132 and through a resistor 138 to the base thereof. The collector of the transistor 132 applies a signal to the conductor 46.

A second clock signal $C_2$ of the waveform 82 (FIG. 4) is applied from a lead 142 through the anode to cathode path of a diode 144 and through a resistor 146 to the base of an npn type transistor 148. The base of the transistor 148 is coupled through a resistor 150 to a —10-volt terminal 152, the emitter is coupled to a —5-volt terminal 154, and the collector is coupled to the base of a pnp type transistor 156. The base of the transistor 156 is also coupled through a resistor 158 to a +10-volt terminal 160, the emitter is coupled to ground and the collector is coupled through a resistor 162 to the base of an npn type transistor 164. The base of the transistor 164 is also coupled through a resistor 166 to a —10-volt terminal 168, the emitter is coupled to the terminal 168 and the collector applies a signal to the conductor 48. The clock signal $C_2$ is also applied from the lead 142 through the anode to cathode path of a diode 170 to the resistor 122 and the transistor 124.

A clock signal $C_3$ of the waveform 84 (FIG. 4) is applied from a lead 174 through the anode to cathode path of a diode 176 and to the resistor 146 and the transistor 148. The clock signal $C_3$ is also applied from the lead 174 through the anode to cathode path of a diode 178 and through a resistor 180 to the base of an npn type transistor 182. The base of the transistor 182 is also coupled through a biasing resistor 186 to a —10-volt terminal 188, the emitter is coupled to a —5-volt terminal 190, and the collector is coupled to the base of a pnp type transistor 194. The base of the transistor 194 is also coupled through a biasing resistor 196 to a +10-volt terminal 198, the emitter is coupled to ground and the collector is coupled through a resistor 200 to the base of an npn transistor 202. The base of the transistor 202 is also coupled through a resistor 205 to a —10-volt terminal 206, the emitter is coupled to the terminal 206, and the collector applies a signal to the conductor 46.

The clock signal $C_4$ of the waveform 86 (FIG. 4) is applied from a lead 212 through the anode to cathode path of a diode 214 to the resistor 100 and the transistor 102. Also, the clock pulse $C_4$ is applied from the lead 212 through the anode to cathode path of a diode 216 and to the resistor 180 and the transistor 182.

In operation, the transistors of FIG. 2 are nonconductive except in response to specific clock pulses. At time $T_1$ the transistor 102 and in turn the transistor 116 are biased into conduction to develop the positive current pulse of the waveform 90. At the same time, the transistor 124 and in turn the transistor 132 are biased into conduction to apply the positive current pulse of the waveform 92 to the conductor 46. At time $T_2$, in response to the clock signal $C_2$ of the waveform 82 (FIG. 4), the transistor 148 and in turn the transistors 156 and 164 are biased into conduction to apply a negative voltage pulse to the conductor 48 as shown by the negative current pulse of the waveform 90. Also, at time $T_2$ the transistor 124 and in turn the transistor 132 are maintained in conduction to continue the positive voltage pulse applied to the conductor 46 indicated by the positive current pulse of the waveform 92.

At time $T_3$, the clock signal $C_3$ of the waveform 84 maintains the transistor 148 and in turn the transistors 156 and 164 biased in conduction. Thus, the negative pulse indicated by the current pulse of the waveform 90 is applied to the conductor 48. At the same time, the transistors 182, 194 and 202 are biased into conduction to apply the negative voltage pulse to the conductor 46 as indicated by the current pulse of the waveform 92. At time $T_4$, the clock signal $C_4$ biases the transistor 102 and in turn the transistor 116 into conduction to apply a positive voltage pulse to the conductor 48 indicated by the current pulse of the waveform 90. Also, at time $T_4$ the clock signal $C_4$ is applied through the diode 216 to maintain the transistors 182, 194 and 202 biased in conduction so that the negative current pulse of the waveform 92 is maintained. The current pulses of the waveforms 90 and 92 are continually applied to the conductors 12 and 10 of FIG. 1 to provide the polyphase driving operation. The operation of the circuit of FIG. 3 continues in a similar manner through other cycles such as $T_1'$ to $T_4'$ and will not be explained in further detail.

Figure 3:
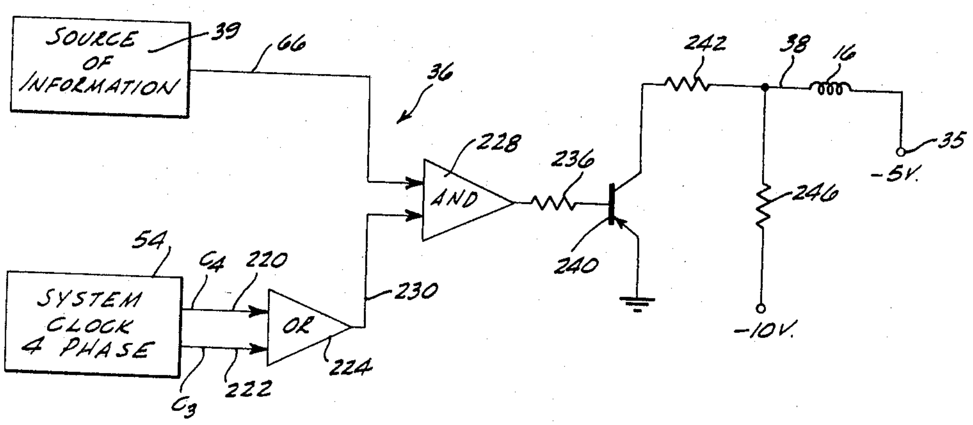
FIG. 3 is a schematic diagram of a write circuit that may be utilized in the system of FIG. 1.

The record or write circuit 36 as shown in FIG. 3 responds to signals applied both from the source of information 39 and from the four phase clock 40. The clock signals $C_3$ and $C_4$ of the waveforms 84 and 86 (FIG. 4) are applied through leads 220 and 222 of the composite lead 42 of FIG. 1 to an "or" gate 224. An "and" gate 228 responds to clock pulses applied from the "or" gate 224 through a lead 230 and to binary informational pulses applied from the source of information 232 through the lead 66. The output signal of the "and" gate 228 is applied through a resistor 236 to the base of a pnp type transistor 240. The emitter of the transistor 240 is coupled to ground and the collector is coupled through a resistor 242 to the lead 38, which in turn is coupled to one end of the record coil 16, the other end of the coil being coupled to the −5-volt terminal 33. The lead 62 is also coupled through a resistor 246 to a −10-volt terminal 248 to provide a current through the coil 16 flowing in the opposite direction from current flowing through the transistor 240.

Figure 4:
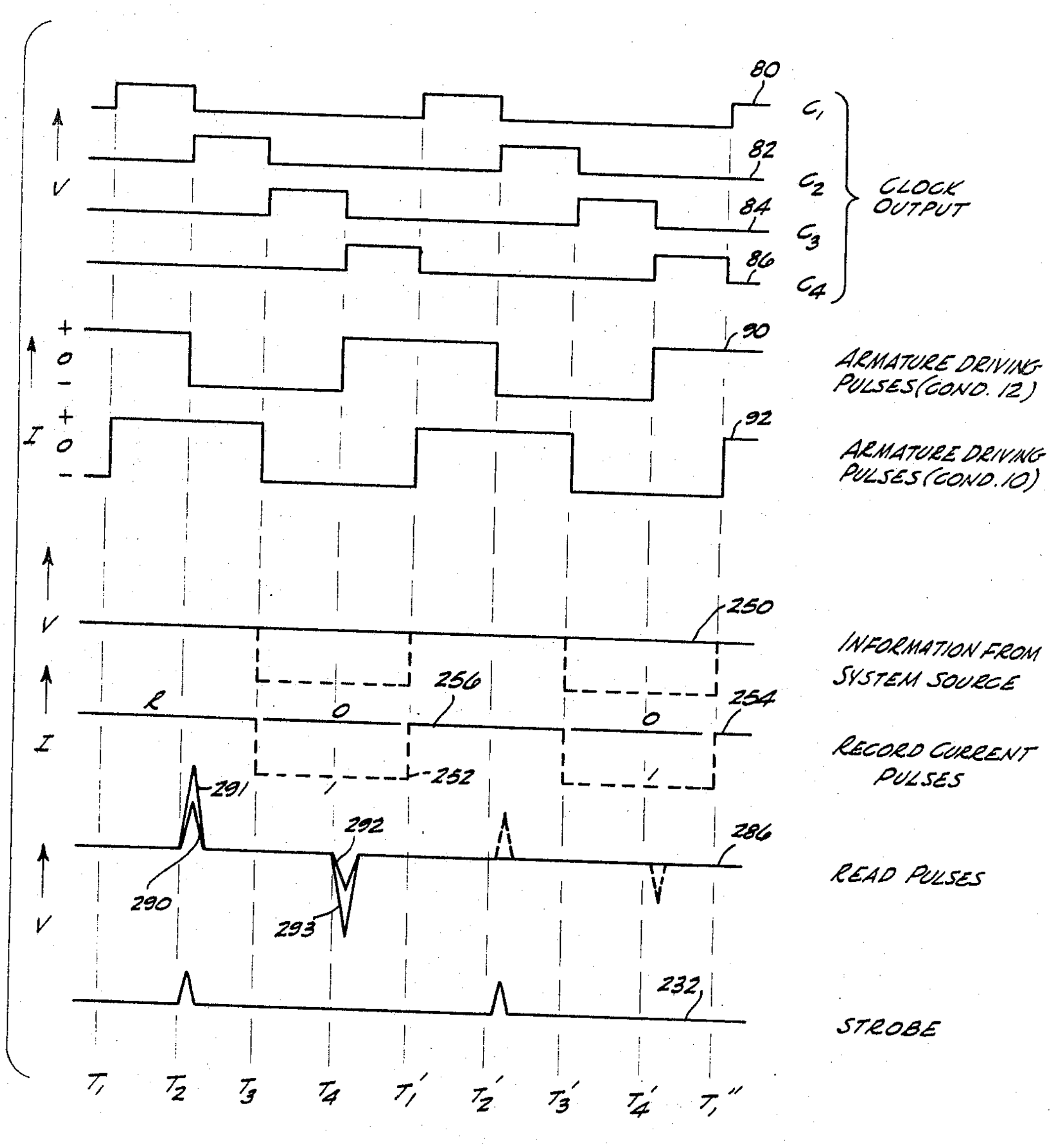
FIG. 4 is a schematic diagram of waveforms showing current and voltage as a function of time for explaining the operation of the system of FIG. 1.

For writing a binary bit into the wire 14 of FIG. 1, an information signal as shown by a waveform 250 of FIG. 4 is applied from the source of information 39 on the lead 66 to the "and" gate 228. As discussed relative to FIG. 1, the source 39 may include an analogue to digital converter as well known in the art, responsive to a source of analogue signals. The clock pulses $C_3$ and $C_4$ are also applied to the "and" gate 228. Thus, during the coincidence of the clock pulses and information pulses at time $T_3$ and $T_4$, that is, between times $T_3$ and $T_1'$, a negative information signal may be applied to the base of the transistor 240 and current as shown by a waveform 254 flows in a first direction through the record coil 16. For representing the binary information, a binary "zero" is selected as the upper voltage level of the waveform 250 and a binary "one" is selected as the lower voltage level of the waveform 250. Between times $T_3$ and $T_1'$, a voltage level of the waveform 250 representing a "zero" prevents a signal from passing through the "and" gate 228 maintaining the transistor 240 nonconductive, and current of the waveform 254 flows in the "zero" direction through the coil 16 from the terminal 35 to the terminal 248.

Between times $T_3$ and $T_1'$, a voltage level representing a "one" coincides with the clock pulses $C_3$ or $C_4$, passing a negative pulse through the "and" 228 to bias the transistor 240 into conduction. Thus, a record current pulse such as level 252 of the waveform 254 of FIG. 4 passes through the record coil 34 in the direction to establish a magnetic domain of a predetermined polarity representing a binary "one" in the combined wire 14 of FIG. 1. The magnetic domains in the wire 14 which are alternately a digit domain of a selected magnetic polarity and a reference domain of a fixed polarity are shown by respective arrows 300 and 304 of FIG. 5.

Thus, the normal current flowing from the terminal 35 to the terminal 248 at a current level 256 of the waveform 254 establishes a magnetic domain of the polarity that is selected to represent a binary "zero" state in the wire 14. During a portion of the four cycle sequence of operation, a magnetic domain of a reference R polarity is recorded on the wires 12 and 26 having the same magnetic orientation or polarity as a "zero." Thus, during phase periods starting with times $T_1$ and $T_2$ of FIG. 4 when clock pulses $C_1$ and $C_2$ are applied to the driving circuit 44, the current level and direction as shown by the waveform 254 is maintained through the coil 16 so that a reference domain is established in the wire 14. It is to be noted that the current levels of the waveform 254 are selected to rapidly establish magnetic states in the wire 14 and to overcome the propagation field thereat. Also, the driving currents of the waveforms 90 and 92 are selected of a level so that the driving fields developed do not affect the magnetic orientations established during writing. Currents are selected for the waveforms such as 90 and 92 to develop translating fields of 4 to 8 oersteds, for example. The writing current of the waveform 254 is selected to produce a total magnetomotive force of over 20 to 35 oersteds, for example, to overcome the translating field at the write coil 34.

Figure 5:
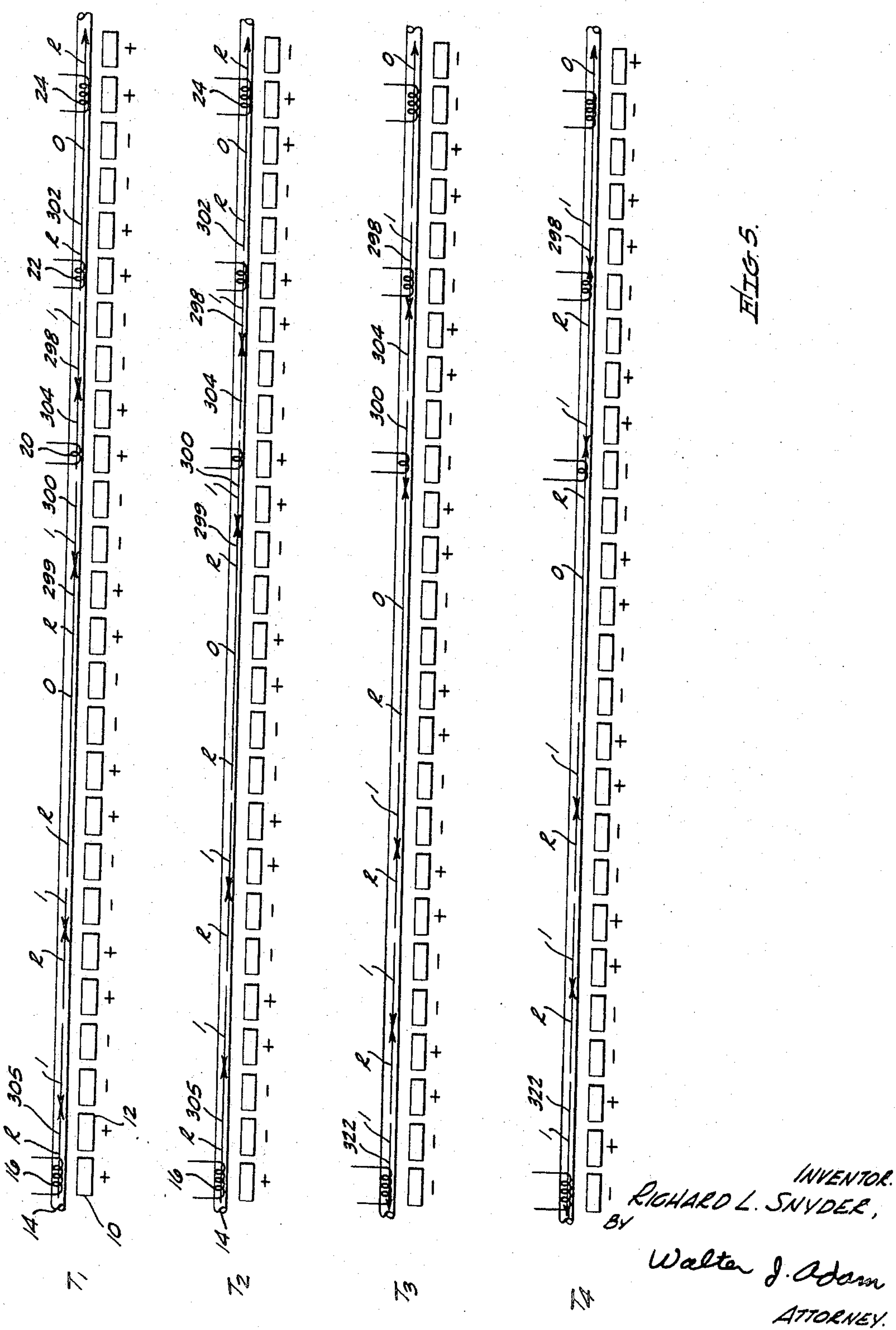
FIG. 5 is a schematic diagram of the magnetic wire utilized in FIG. 1 for explaining the sequential propagation of the magnetic domains therethrough.

In operation, as the magnetic domains in the wire 14 as shown in FIG. 5 are propagated to a position adjacent and past the read coils 20, 22 and 24, informational signals of a waveform 286 of FIG. 4 are derived therefrom. It is to be noted that the operation is similar at each of the coils 20, 22 and 24 except different more signficant bits of the binary number are in the corresponding positions. A similar operation is performed at other sets of sense coils indicated by the sense coil 26 which form signals that are applied to the sense amplifier 32 in series with the signal on the lead 30 or are applied to other sense amplifiers (not shown) for being combined or compared with the signal on the lead 58. A "zero" may be selected as the absence of an output signal at the read coil 20 and a "one" may be sensed by a sequential positive and negative pulse as shown by the waveform 286 of FIG. 4. Thus, during a "zero" condition or the absence of a signal at the coil 20 a pulse signal of the waveform 286 is not applied to the lead 30. When a "one" condition is being interpreted and a positive pulse such as 290 is sensed by the coil 20, and weighted voltages are sensed by the coils 22 and 24, the sense amplifier which is strobed shortly after time $T_2$ by a pulse of the waveform 232, applied a voltage to the lead 30 such as a voltage 291 which is the sum of the voltage derived from the coils 20, 22 and 24. The peak of the analog voltage of the pulse 291 may be applied to a gated box car circuit in the system 60 or utilized in other conventional arrangements. At the occurrence of a negative pulse 292 of the waveform 286, which may represent the voltage developed by the coil 20, the sense amplifier 32 is not strobed so a combined signal of a pulse 293 is not passed therethrough.

Depending on the speed of propagation of the magnetic domains (FIG. 5) along the wire 14, the pulses such as 290 of FIG. 4 are sensed a short time subsequent to time $T_2$ or corresponding times of other four phase cycles. Also, it is to be noted that the time of occurrence of the output pulses 291 and 293 is dependent upon the position of the read coils 20, 22 and 24 relative to the propagating conductor segments which positions may be selected to provide other timing arrangement in accordance with the principles of this invention.

Referring now principally to FIGS. 4 and 5, a sequence of the conductor currents through various segments of the conductors 10 and 12 is shown shortly after times $T_1$, $T_2$, $T_3$ and $T_4$ of the four phase sequence. The segments of the conductors are shown in FIG. 5 so that the direction of propagation of the magnetic domains from the write coil 16 to the read coils 20, 22 and 24 and the other sets of read coils such as a set including the coil 26 is from left to right through the wire 14. In the example shown, a binary number "011" has been recorded in the wire 14 as shown by the arrows 296, 298 and 300 shortly after time $T_1$ and is in a position to be read. Also, a "011" has been recorded and stored to the left of the arrow 300 to be read three cycles later. The polarity for a "zero" has been selected with the arrow to the right and the polarity for a "one" has been selected with the arrow to the left in the wire 14. Reference domains shown by arrows 299, 302 and 304 are of the same polarity as the "zero" domains. Considering the view presented in FIG. 5, it may be convenient to designate a "zero" and a reference "R" as having a clockwise magnetic polarity and a "one" as having a counter-clockwise magnetic polarity. The arrow 299 includes two reference portions and a "zero" portion because like magnetic domains expand to a domain of opposite polarity. It is to be again noted that complementary adjacent magnetic wires or mediums may also be utilized in accordance with the invention having domains of opposite magnetic polarities to form essentially closed magnetic loops.

At time $T_1$, the polarity of the driving current of the waveforms 92 and 90 of FIG. 4 in the first segments of the conductors 10 and 12 is positive and the polarity of the driving current in the second segments of the conductors 10 and 12 is negative or the inverse of the respective waveforms 92 and 90. At time $T_1$ in response to the record current of the waveform 254, a reference domain of an arrow 305 is established in the wire 14, as all of the domains are propagated forward one conductor segment width from the previous condition. The writing field is of a substantially larger magnitude than the propagating field so that the domains are established in the wire 14 regardless of the direction of the propagating field at the write coil 16. Because the other domains are propagated forward, the domain established by the write coil 16 expands with the propagation and is effectively propagated with the other domains in the wires.

At time $T_2$ as shown by the waveforms 92 and 90, the driving current polarities of the respective conductors 10 and 12 and the two adjacent segments are respectively + − − + and in response to the record current of the waveform 254 the reference domain of the arrow 305 is further recorded in the wire 14. Each magnetic domain in the wire 14 is again propagated one conductor width forward so that each arrow head or tail, for example, is between two conductors of opposite polarity such as the tail of the arrows 300 and 304 between the conductors 12 and 10. The domain wall of the "one" domain of the arrow 300 is propagated past the read coil 20 so that the positive signal 290 of the waveform 286 is sensed by the read coil 20. Also, the domain wall of the "one" domain of the arrow 298 is propagated past the coil 22 to form a voltage signal similar to the waveform 290 except of proportionally larger magnitude. The "zero" domain condition of the arrow 296 is also propagated past the coil 24 but a voltage signal is not induced thereat. The combined analogue voltage of the pulse 291 in coincidence with a strobe pulse of the waveform 232 is applied through the sense amplifier 32 (FIG. 1) as the analogue equivalent of the binary number "011."

At times $T_3$ in response to the driving pulses of the waveforms 92 and 90, the first two segments of each of the conductors 10 and 12 respectively have − − + + current polarities applied thereto. Thus, the magnetic domains are propagated one conductor width forward. In response to the record current pulse of the waveform 254 at the level 252 for writing a "one," for example, a magnetic domain shown by an arrow 322 is established in the wire 14.

At time $T_4$ in response to the armature driving pulses of the waveforms 92 and 90, the current polarities of the respective conductors 10 and 12 and the adjacent segments thereof is respectively − + + − and the magnetic domains are again propagated one conductor width forward to the right so that each domain wall represented by either two arrow heads or two arrow tails is between propagating fields of opposite polarity. Also at time $T_4$, the current pulse at the level 252 of the waveform 254 for writing a "one" continues and the "one" domain of the arrow 322 is further expanded. Shortly after time $T_4$, the "one" domains of the arrows 300 and 298 are propagated over the coils 20 and 22 so that the negative signal 292 and the combined signal 293 of the waveform 386 are induced therein.

The operation continues in a similar manner propagating the domain walls one conductor width forward during each time period with the binary "zero" of an arrow 299 passing over the coil 20 shortly after time $T_2$ but not developing a pulse of the waveform 286 because a domain wall is not present between a "zero" domain and a reference domain. Also, the binary "one" of the arrows 298 and 300 pass adjacent to the coils 24 and 22 to form a signal of the waveform 286 shortly after time $T_{2'}$ but a strobe pulse is not applied to the sense amplifier 32 because of the control of the counter 54 (FIG. 1). During the third cycle at time $T_{1''''}$ (not shown), the next number is in position to be converted to an analogue equivalent value shortly after time $T_{2''''}$ (not shown). Thus, for a binary number of three bits and with the serial arrangement of FIG. 1, a conversion is performed during every third cycle.

In accordance with the principles of this invention utilizing a one mil diameter wire, a domain length of ¼ inch is sufficiently stable to allow storage and conversion of a large number of binary numbers. It is to be again noted that in accordance with the invention, additional sets of coils 20, 22 and 24 may be utilized at other positions along the wire 14 so that conversion of a plurality of numbers may be performed in parallel. Also, in accordance with the principles of the invention, only certain bits of the numbers may be sensed in some arrangements such as selected ones of the most significant bits, for example, by selecting and positioning the sense conductors. Although the system of FIG. 1 has been shown for numbers of three binary bits, numbers of less or more binary bits may be converted to analogue values in accordance with the principles of the invention.

Figure 6:
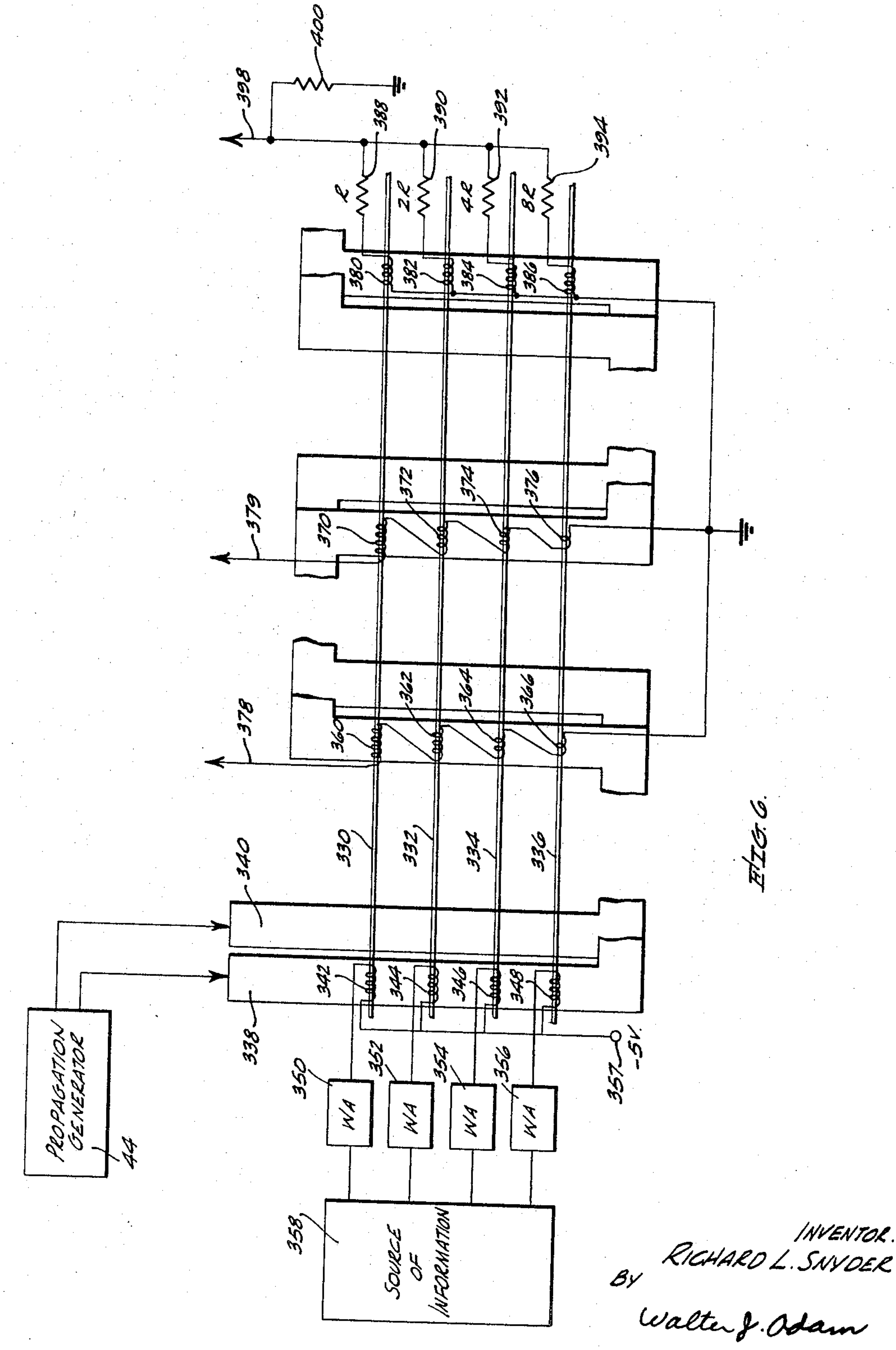
FIG. 6 is a schematic diagram of a converter system utilizing a plurality of parallel magnetic mediums and sense conductors in accordance with the invention.

Referring now to FIG. 6, an arrangement is shown in accordance with the principles of the invention in which binary numbers of four binary bits, for example, are stored and propagated in parallel through a plurality of magnetic mediums or wires 330, 332, 334 and 336. Propagating conductors 338 and 340 are provided similar to the conductors 10 and 12 of FIG. 1 responsive to the propagation generator 44. Write coils or conductors 342, 344, 346 and 348 are coupled to respective wires 330, 332, 334 and 336 at first ends thereof adjacent to the conductor 338, for example. A plurality of writing circuits 350, 352, 354 and 356 responsive to a source 358 of information pulses are respectively coupled to a −5-volt terminal 357 through the write coils 342, 344, 346 and 348 for recording reference domains and informational domains. Sense conductors or coils 360, 362, 364 and 366 are wound around or magnetically coupled to respective wires 330, 332, 334 and 336 at common positions therealong such as adjacent to the same segment of the conductor 338. The number of segments provided between the write coils and the read coils determines the amount of storage provided before a conversion is performed. The read coils 360, 362, 364 and 366 which are coupled in series may respectively have 16, 8, 4 and 2 turns or turns in that ratio to respectively respond to the most significant to least significant bits of the four bit number or word. A similar set of series coupled coils 370, 372, 374 and 376 having a respective turns ratio of 16, 8, 4 and 2 is provided at another position along the respective magnetic wires 330, 332, 334 and 336 and for a consistent timing operation may be adjacent to a segment of the conductor 338. Sense leads 378 and 379 respectively respond to the series combined voltages induced in the coils 360, 362, 364 and 366 and in the coils 370, 372, 374 and 376. Thus, a plurality of binary numbers may be converted to analogue values at the same time. Also in accordance with the invention, by properly positioning an entire set of read coils such as that including coils 370 and 372, analogue values may be developed with desired time or phase relations for being combined with other analogue values such as developed by the set of read coils including coils 360 and 362. Thus in operation, the binary bits are recorded in the wires 330, 332, 334 and 336 in parallel from appropriate registers and control circuits in the source 358. The writing operation may be performed at times $T_3$ and $T_4$ (FIG. 4) similar to the arrangement of FIG. 1 as determined by the propagating pulses and the positions of the sense coils. Sensing may be performed shortly after time $T_2$ or at other times at certain read coils or sets thereof if analogue values are being formed at different phase relations. The arrangement of FIG. 6 allows a digital to analogue conversion to be performed during each cycle by a single set of read coils.

Although the voltages are added in series on the sense leads 378 and 380, the induced currents may be added in parallel in accordance with the principles of the invention. Read coils or conductors 380, 382, 384 and 386 are shown coupled or wound around the respective wires 330, 332, 334 and 336 with similar numbers of turns or loops, for example. To perform the binary weighting, resistors or impedances 388, 390, 392 and 394 are coupled to one end of the respective coils 380, 382, 384 and 386 of values respectively of the ratio R, 2R, 4R and 8R. The resistors such as 388 are coupled to a sense lead 398 which in turn is coupled through a resistor 400 or to a suitable source of reference potential such as ground. The other ends of each of the coils 380, 382, 384 and 386 are coupled to a suitable source of reference potential such as ground. Thus, in response to the domain walls passing the coils 380, 382, 384 and 386 at a selected time, the induced currents are summed in the resistor 400 to apply an equivalent analogue voltage to the sense lead 398.

Figure 7:
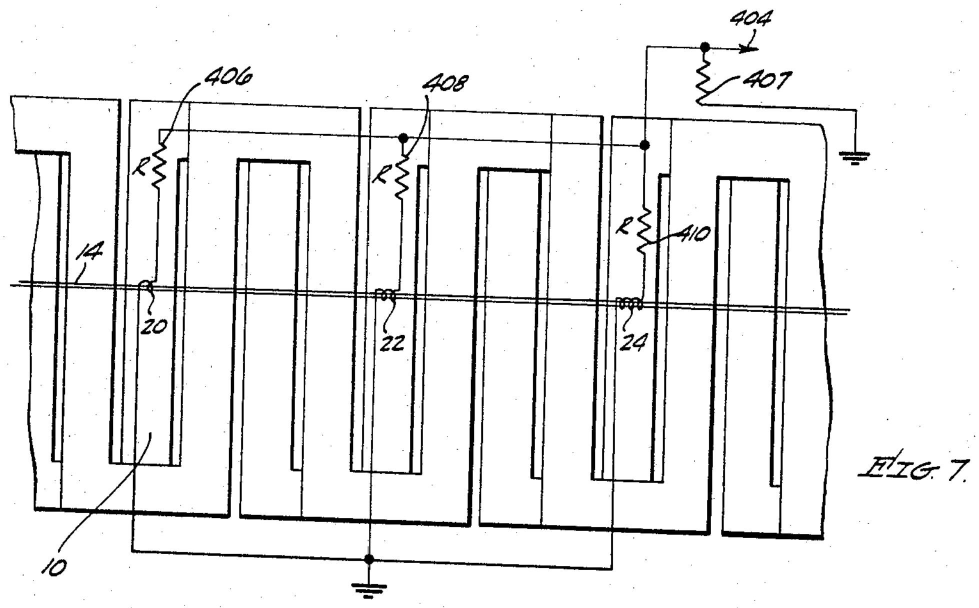
FIG. 7 is a schematic arrangement of a converter system in accordance with the invention in which currents developed by the sense conductors are added in parallel.

Referring now to FIG. 7, another arrangement in accordance with the principles of the invention is similar to that of FIG. 1 except the induced currents are added in parallel to form the analogue signal. The coils 20, 22 and 24 wound around or coupled to the magnetic medium or wire 14 may be coupled at one end to a suitable source of reference potential such as ground and coupled at the other ends to a sense lead 404 through respective resistors 406, 408 and 410 which may have similar values R. A resistor 407 coupled between the lead 404 and a suitable source of reference potential such as ground sums the parallel currents to an analogue voltage value. The propagating and timing arrangement may be similar to that discussed relative to FIG. 1 and will not be explained in further detail.

Figure 8:
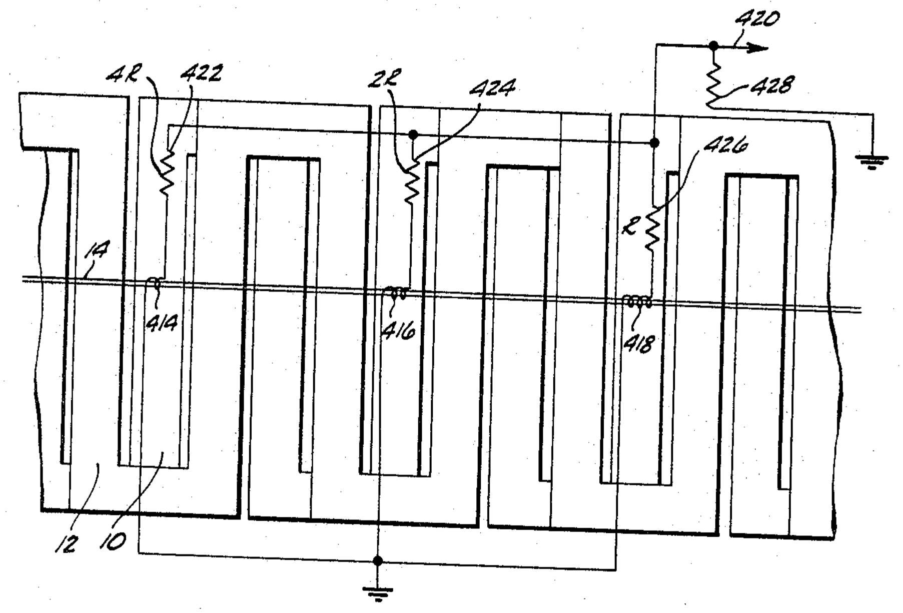
FIG. 8 is a schematic arrangement of a converter system in which the weighting of the digital signals is provided by impedance elements of different values in accordance with the invention.

Referring now to FIG. 8, an arrangement is shown in accordance with the invention in which the single magnetic medium or wire 14 is utilized with coils 414, 416 and 418 coupled thereto or wound therearound in positions relative to the propagating conductors 10 and 12 which may be similar to the arrangement of FIG. 1. First ends of each of the coils 414, 416 and 418 may be coupled to a suitable source of reference potential such as ground and second ends are coupled to a sense lead 420 through respective resistors 422, 424 and 426. The coils 414, 416 and 418 may have similar numbers of turns and the resistors 422, 424 and 426 may have respective relative values of 4R, 2R and R so that binary weighted currents from the least significant to the most significant flow to the lead 420 when domain walls (representing a "one") are propagated past the read coils. A resistor 428 may be coupled between the sense lead 420 and a suitable source of reference potential such as ground to develop a summed voltage signal on the lead 420. The operation of the arrangement of FIG. 8 with an analogue to digital conversion being performed every third cycle is similar to that discussed relative to FIG. 1 and will not be explained in detail.

The system of the invention may operate with any number of sense coils having any desired turns ratio such as that of increasing binary significance which for a four-bit number is 1, 2, 4 and 8. However, the actual number of turns may be 8, 16, 32 and 64, for example, to increase the amplitude of the summed signal.

Thus, the digital to analogue converters in accordance with the invention respond to digital signals or encoded analogue signals and store them in a magnetic medium or in a plurality of magnetic mediums. The stored binary information is then reproduced by detecting the passage of domain walls at coils formed of turns whose number is proportional to the value of the bit position being reproduced. All of the coils which sense the signals representative of the bits of one number are subject to excitation at the same time and may be connected in series so that their voltages are summed or may be connected in parallel so that their currents are summed. The sum of these voltages is proportional to the recorded binary number and hence to the voltage of the stored analogue signal. Other arrangements in accordance with the invention provide weighting by proportional impedance elements coupled to similar sense coils. The systems in accordance with the invention provide analogue voltage values reliably equivalent to the stored digital values because of the absence of noise from the established and propagated domains and because of the consistent intensity of the stored magnetic fields along the magnetic medium or mediums.

What is claimed is:

1. A digital to analogue converter system for converting digital numbers to analogue signals comprising
- a magnetic wire for storing a series of alternate reference domains of a first polarity and magnetic informational domains of a selected first or second polarity representative of a digital number,
- means including a propagating array coupled to said magnetic wire for sequentially propagating said domains therealong,
- and means including a plurality of sense coils respectively having turns in a ratio representative of the binary significance of the informational domains of said digital number, said sense coils magnetically coupled to said magnetic wire in positions to respond at substantially the same time to the magnetic informational domains of said number to develop weighted signals, said means combining said weighted signals to develop an analogue signal representative of the stored digital number.

2. A system for converting digital numbers to equivalent analogue signals comprising
- an elongated magnetic medium for storing a series of magnetic informational domains representative of the binary bits of a digital number,
- propagating array means magnetically coupled to said medium for sequentially propagating said magnetic domains therealong,
- and means including a plurality of sense coils positioned along said medium for simultaneously responding to said domains propagated along said medium and developing an equivalent analogue signal, said plurality of sense coils magnetically coupled to said medium with a turns ratio proportional to the binary significance of the corresponding bits of said number when developing said analogue signal.

3. A digital to analogue converter comprising
- a plurality of magnetic wires each storing a magnetic informational domain of different binary significance, the domains stored in said plurality of mediums representative of a binary number,
- means coupled to said plurality of magnetic wires for propagating said domains therealong,
- a plurality of sense coils each coupled to a different one of said plurality of mediums for responding at substantially the same time to the magnetic informational domains propagated thereby, said sense coils having relative numbers of turns proportional to the binary significance of the informational domain in the corresponding wire.

4. A digital to analogue converter comprising a plurality of elongated magnetic mediums for alternately storing a reference domain of a first polarity and storing an informational domain of a selected first or second polarity representative of a bit of a digital number, propagating means coupled to said plurality of mediums for sequentially propagating the domains therealong, writing means coupled to first positions of said plurality of mediums for alternately recording in parallel a plurality of the reference domains and a plurality of the informational domains, the polarities of the domains of each plurality of said informational domains being representative of the binary bits of a digital number, and a plurality of sense coils each coupled to second positions of said plurality of mediums, said plurality of sense coils having a turns ratio proportional to the binary significance of the corresponding binary bits.

5. A system for converting binary numbers to analogue signals comprising a plurality of magnetic wires for storing magnetic reference domains of a first polarity and magnetic informational domains of a selected first or second polarity, propagating means coupled to said plurality of magnetic wires for periodically propagating said domains therealong from first positions to second positions, means coupled to said plurality of magnetic wires at said first positions for alternately establishing in parallel a plurality of said reference domains and a plurality of said informational domains in said wires so that the informational domain in each medium represents a bit with a different binary significance of a binary number, a plurality of sense coils each magnetically coupled to a different wire at said second position for responding to the magnetic informational domains of said second polarity propagated thereby, said sense coils each coupled to said wires with a relative number of turns proportional to the binary significance of the binary bits stored in the corresponding wire, and summing means coupled to said plurality of sense coils to form an analogue signal equivalent to said binary number.

References Cited

UNITED STATES PATENTS

| | | | |
|---|---|---|---|
| 2,919,432 | 12/1959 | Broadbent | 340—174 |
| 2,932,449 | 4/1960 | Pisarchik | 340—347 |
| 2,970,308 | 1/1961 | Stringfellow et al. | 340—347 |
| 3,068,453 | 12/1962 | Broadbent | 340—174 |
| 3,102,258 | 8/1963 | Curry | 340—347 |
| 3,126,531 | 3/1964 | Crowley et al. | 340—174 |
| 3,129,412 | 4/1964 | Lovell | 340—174 |
| 3,241,126 | 3/1966 | Snyder | 340—174 |
| 3,241,127 | 3/1966 | Snyder | 340—174 |

MAYNARD R. WILBUR, *Primary Examiner.*

W. J. KOPACZ, *Assistant Examiner.*